US012647943B2

(12) United States Patent
Zhang et al.

(10) Patent No.: US 12,647,943 B2
(45) Date of Patent: Jun. 2, 2026

(54) METHODS AND SYSTEMS FOR REFERENCE SIGNALING IN WIRELESS COMMUNICATION NETWORKS

(71) Applicant: ZTE Corporation, Shenzhen (CN)

(72) Inventors: Shujuan Zhang, Shenzhen (CN); Chuangxin Jiang, Shenzhen (CN); Bo Gao, Shenzhen (CN); Huahua Xiao, Shenzhen (CN); Hao Wu, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 606 days.

(21) Appl. No.: 18/053,575

(22) Filed: Nov. 8, 2022

(65) Prior Publication Data

US 2023/0067619 A1     Mar. 2, 2023

Related U.S. Application Data

(63) Continuation of application No. PCT/CN2020/098763, filed on Jun. 29, 2020.

(51) Int. Cl.
| | |
|---|---|
| *H04W 72/02* | (2009.01) |
| *H04L 5/00* | (2006.01) |
| *H04W 36/08* | (2009.01) |
| *H04W 72/04* | (2023.01) |
| *H04W 72/044* | (2023.01) |

(52) U.S. Cl.
CPC ........... *H04W 72/02* (2013.01); *H04L 5/0051* (2013.01); *H04W 36/08* (2013.01); *H04W 72/044* (2013.01)

(58) Field of Classification Search
CPC ............. H04W 24/02; H04W 72/0446; H04W 72/0457; H04W 72/231; H04W 72/232; H04W 8/26; H04W 36/08; H04W 48/12; H04L 2/26025; H04L 27/26025; H04L 36/08
USPC .................................................. 370/329–330
See application file for complete search history.

(56) References Cited

U.S. PATENT DOCUMENTS

| | | | | |
|---|---|---|---|---|
| 2016/0119095 A1* | 4/2016 | Lee | ........................ | H04L 5/0073 |
| | | | | 370/329 |
| 2018/0262313 A1 | 9/2018 | Nam et al. | | |
| 2021/0337455 A1* | 10/2021 | Zhou | ................. | H04W 36/0061 |
| 2021/0360611 A1* | 11/2021 | Manolakos | ........... | H04L 5/0044 |
| 2023/0180242 A1* | 6/2023 | Cirik | ..................... | H04L 5/0023 |
| | | | | 370/329 |
| 2023/0209561 A1* | 6/2023 | Matsumura | ........... | H04W 72/54 |
| | | | | 370/329 |

(Continued)

FOREIGN PATENT DOCUMENTS

| | | |
|---|---|---|
| CN | 104982063 | 10/2015 |
| CN | 107210826 | 9/2017 |

(Continued)

OTHER PUBLICATIONS

Co-Pending SG Application No. 11202260117P, Written Opinion dated Feb. 19, 2025, 8 pages.

(Continued)

*Primary Examiner* — Candal Elpenord
(74) *Attorney, Agent, or Firm* — Perkins Coie LLP

(57) ABSTRACT

Apparatuses, methods, systems, and computer readable media are disclosed. In one aspect, a wireless communication method is disclosed. The method includes determining, by a wireless device, a plurality of physical cell identifiers of a serving cell.

20 Claims, 21 Drawing Sheets

(56)　　　　　References Cited

U.S. PATENT DOCUMENTS

| | | | | |
|---|---|---|---|---|
| 2023/0262783 A1* | 8/2023 | Zhou | .................. | H04W 52/241 |
| | | | | 370/329 |
| 2023/0318687 A1* | 10/2023 | Kim | .................. | H04B 7/06968 |
| | | | | 370/329 |

FOREIGN PATENT DOCUMENTS

| CN | 110463087 | 11/2019 |
|---|---|---|
| CN | 110519854 A | 11/2019 |
| GB | 2579042 | 6/2020 |
| WO | 2017189118 A1 | 11/2017 |
| WO | 2018/089213 | 5/2018 |
| WO | 2018152153 A1 | 8/2018 |
| WO | 2019/130938 | 7/2019 |

OTHER PUBLICATIONS

Qualcomm Incorporated, "Cell Definition for NR," 3GPP TSG RAN2 NR AH#0118, Vancouver, Canada, R2-1800210, Jan. 22-26, 2018, 3 pages.

CIPO, Office Action for Canadian Application No. 3,183,451, mailed on Apr. 30, 2024, 6 pages.

Co-Pending CN Application No. 2020801024789, Office Action dated Jul. 31, 2024, 26 pages with unofficial translation and summary.

Huawei, et al. "Feature Summary of Enhancements on Multi-TRP/Panel Transmission" 3GPP TSG RAN WG1 Meeting #98bis R1-1911425, Chongqing, China, Oct. 14-20, 2019 100 Pages.

Qiubin et al "Research on 5G New Radio Large-Scale Beamforming Technology" Information and Communications Technology and Policy No. 11, Nov. 11, 2018, 16 pages with machine translation.

Samsung, "On Rel. 17 FeMIMO WI," 3GPP TSG RAN WG1 #101, e-Meeting, R1-2003918, 12 pages, May 25-Jun. 5, 2020.

Mediatek Inc., "RRM Measurement Considering Bandwidth Part Operation," 3GPP TSG RAN WG2 #99-bis, Prague, Czech, R2-1710882, 4 pages, Oct. 9-13, 2017.

International Search Report and Written Opinion for International Application No. PCT/CN2020/098763, mailed on Mar. 29, 2021 (9 pages).

CATT "Corrections for RACH Records Structure" 3GPP TSG RAN WG2#109-e R2-2000105, Electronic meeting, Feb. 24-Mar. 6, 2020, 19 pages.

Nokia et al. "Multiple rate matching patterns with M-TRP", 3GPP TSG-RAN WG2 Meeting #109-e R2-2000860, Elbonia, Online, Feb. 24-Mar. 6, 2020, 28 pages.

Qualcomm, "Summary of 7.2.8.4: Physical-layer procedures to support UE/gNB measurements," 3GPP TSG-RAN WG1 Meeting #100bis-e R1-2002713, e-Meeting, Apr. 20-30, 2020, 34 pages.

Qualcomm "Summary of Email Discussion [100e-NR-Pos-PHY procedures-01]: PRS reception procedure" 3GPP TSG-RAN WG1 Meeting #100-e R1-2001364, e-Meeting, Feb. 24-Mar. 6, 2020, 47 pages.

Nokia et al. "No. 17, N019: RA-report also for failed RA procedures" 3GPP TSG-RAN WG2 Meeting #109bis-e R2-2003163, Elbonia, Apr. 20-30, 2020, 11 pages.

Nokia, "Summary of open issues for IIOT WI" 3GPP TSG-RAN WG2 Meeting #109 R2-2001046 Athens, Greece, Feb. 24-28, 2020, 5 pages.

CATT, "Corrections for the Content of RACH Records" 3GPP TSG RAN WG2#109-e R2-2000106, Electronic meeting, Feb. 24-Mar. 6, 2020.

Co-Pending EP Application No. 20942819.2, Extended European Search Report dated Jul. 6, 2023, 13 pages.

Huawei, et al. "Definition of Cells for Idle and connected UEs" 3GPP TSG-RAN WG2 Meeting #99bis, Prague, Czech Republic, Oct. 9-13, 2017, R2-1710216, 4 pages.

Ericsson "Report of email discussion [107#39] [NR-eMIMO]" 3GPP TSG-RAN WG2 Meeting #107bis Chongqing, China, Oct. 14-18, 2019; Tdoc R2-1912700, 34 pages.

Co-Pending CN Application No. 2020801024789, 2nd Office Action dated Jan. 8, 2025, 12 pages with unofficial English summary.

CNIPA, Rejection Decision for Chinese Application No. 202080102478.9, mailed on Apr. 24, 2025, 12 pages with unofficial English translation.

EP Application No. 20942819.2, Article 94 Communication dated Oct. 29, 2025, 5 pages.

KIPO, Office Action for Korean Application No. 10-2022-7046204, mailed on Oct. 28, 2025, 10 pages with unofficial English translation.

EPO, Communication pursuant to Article 94(3) EPC for European Application No. 20 942 819.2, mailed on Oct. 29, 2025, 5 pages.

MCC Support, "Final Report of 3GPP TSG RAN WG1 #97 v1.0.0 (Reno, USA, May 13-17, 2019)," 3GPP TSG RAN WG1 Meeting #98, Prague, Czech Republic, R1-1907973, Aug. 26-30, 2019, 163 pages.

* cited by examiner

1200

1210

Determine, by a wireless device, a plurality of physical cell identifiers of a serving cell

1300

1310

Determine, by a wireless device, a first physical cell identifier corresponding to a target element from the plurality of physical cell identifiers

1320

Determine one or more parameters of the target element based on the first physical cell identifier, wherein the target element includes a channel or a signal

*1400*

1410

Determine whether boundaries of radio frames
corresponding to the plurality of physical cell
identifiers are aligned

1500

1510

Determine a bandwidth part switching delay based on
a relationship between a third physical cell identifier
of a newly activated bandwidth part and a second
physical cell identifier of an old bandwidth part

1600

1620

Determine a time of applying a new parameter in a
signaling according to a relationship between a fourth
physical cell identifier of a parameter included in the
signaling and a fifth physical cell identifier of an old
parameter

1700

1710

Determine a sixth physical cell identifier from the plurality of physical cell identifiers of the serving cell

1720

Determine a mobility measurement result of the serving cell based on mobility measurement reference signals of the sixth physical cell identifier

*1800*

1810

Determine a seventh physical cell identifier from the plurality of physical cell identifiers of the serving cell

1820

Use the seventh physical cell identifier to obtain first common information

Figure 19:
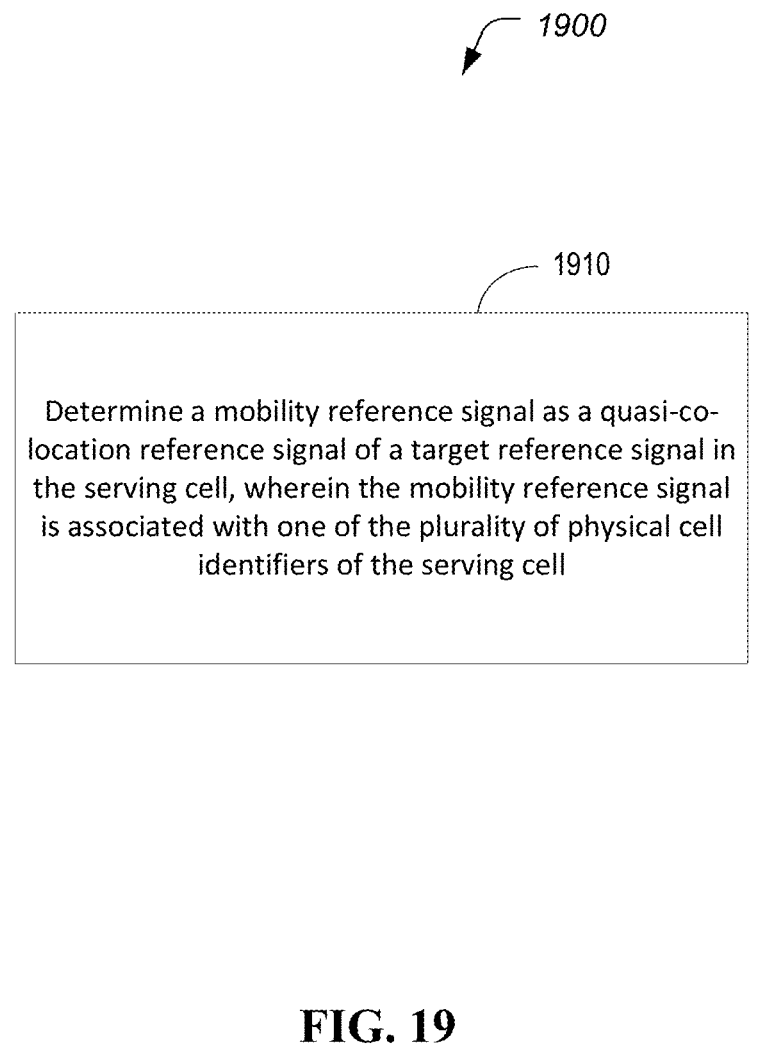

1900

1910

Determine a mobility reference signal as a quasi-co-location reference signal of a target reference signal in the serving cell, wherein the mobility reference signal is associated with one of the plurality of physical cell identifiers of the serving cell

Determine a mobility measurement reference signal
as a quasi-co-location reference signal of a target
reference signal in a serving cell

METHODS AND SYSTEMS FOR REFERENCE SIGNALING IN WIRELESS COMMUNICATION NETWORKS

CROSS-REFERENCE TO RELATED APPLICATIONS

This application is a continuation of International Patent Application No. PCT/CN2020/098763, filed on Jun. 29, 2020, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Apparatuses, methods, systems, and computer readable media are disclosed. In one aspect, a wireless communication method is disclosed. The method includes determining, by a wireless device, a plurality of physical cell identifiers of a serving cell.

In another aspect, a wireless communication method includes determining, by a wireless device, a first physical cell identifier corresponding to a target element from the plurality of physical cell identifiers, and determining one or more parameters of the target element based on the first physical cell identifier, wherein the target element includes a channel or a signal.

In another aspect, a wireless communication method includes determining, by a wireless device, whether boundaries of radio frames corresponding to the plurality of physical cell identifiers are aligned.

In another aspect, a wireless communication method includes determining, by a wireless device, a bandwidth part switching delay depending on a relationship between a third physical cell identifier of a newly activated bandwidth part and a second physical cell identifier of an old bandwidth part.

In another aspect, a wireless communication method includes determining, by a wireless device, a time of applying a new parameter in a signaling according to a relationship between a fourth physical cell identifier of a parameter included in the signaling and a fifth physical cell identifier of an old parameter.

In another aspect, a wireless communication method includes determining, by a wireless device, a sixth physical cell identifier from the plurality of physical cell identifiers of the serving cell, and determining a mobility measurement result of the serving cell based on mobility measurement reference signals of the sixth physical cell identifier.

In another aspect, a wireless communication method includes determining, by a wireless device, a seventh physical cell identifier from the plurality of physical cell identifiers of the serving cell, and using the seventh physical cell identifier to obtain first common information.

In another aspect, a wireless communication method includes determining, by a wireless device, a mobility reference signal as a quasi-co-location reference signal of a target reference signal in the serving cell, wherein the mobility reference signal is associated with one of the plurality of physical cell identifiers of the serving cell.

In another aspect, a wireless communication method includes determining, by a wireless device, a mapping relationship between the plurality of physical cell identifiers and one or more M fourth parameters, wherein M is positive integer. The fourth parameters includes at least one of following parameter: RNTI (Radio Network Temporary Identifier); the association between RACH resources and SSB(s); the association between RACH resources and CSI-RS; common RACH resources, and system information.

In another aspect, a wireless communication method includes determining a mobility measurement reference signal as a quasi-co-location reference signal of a target reference signal in a serving cell.

The above and other aspects and their implementations are described in greater detail in the drawings, the descriptions, and the claims.

BRIEF DESCRIPTION OF THE DRAWING

FIG. 19 shows an example of a wireless communication method based on some embodiments of the disclosed technology.

DETAILED DESCRIPTION

Figure 1:
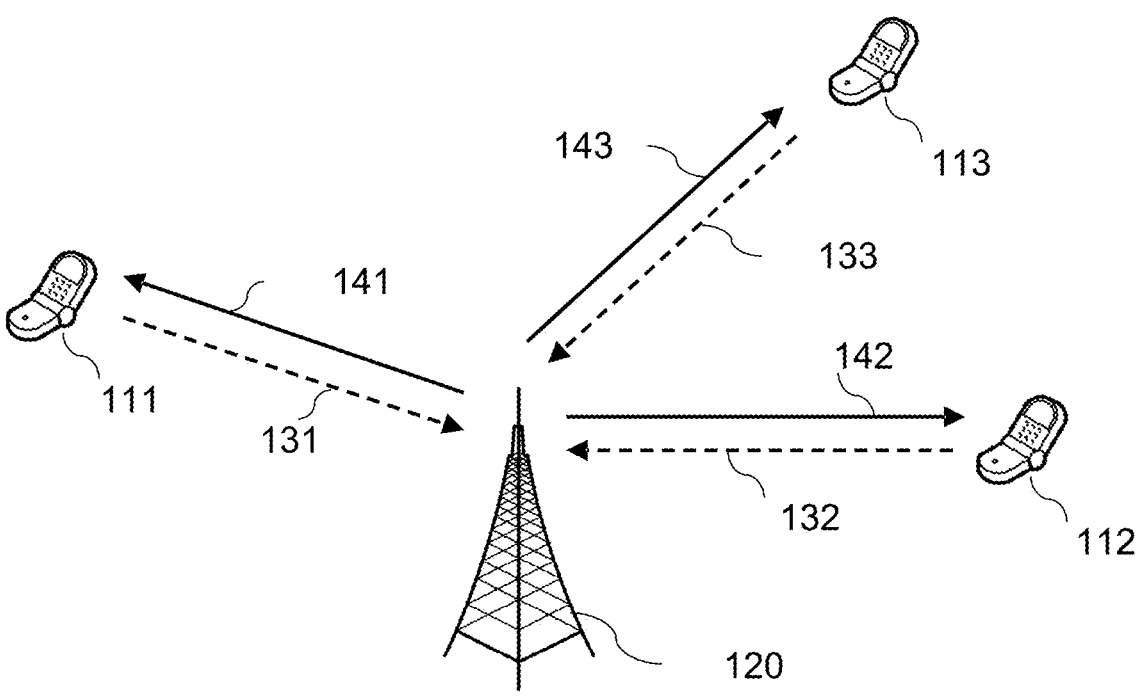
FIG. 1 shows an example of a wireless communication system.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The 5th generation (5G) mobile communication system enables a variety of application scenarios. With the increasing use of wireless communication technologies in many applications, the 5G mobile communication focuses on researching and supporting the characteristics of enhanced mobile broadband, ultra-high reliability, ultra-low-latency transmission, and massive connections.

In 5G and other mobile communication systems, handover procedures are used to reduce interruption time when a user equipment (UE) moves from one cell to another cell. However, the handover procedures of the UE may lead to a lower communication rate. In particular, when the UE is in an edge area of the cell, the high-complexity, large-delay traditional handover procedures with low cell handover success rate can result in a significant decrease in the UE's communication performance during the cell handover procedures.

5G New Radio (NR) specifications in Release 15 and Release 16 (NR Rel-15, NR Rel-16) adopt the dual active protocol stack (DAPS) scheme and the conditional handover (CHO) scheme to address these issues. However, the complexity of DAPS can pose some challenges in implementing efficient, reliable handover procedures in the wireless communication network in that DAPS requires the UE to support two cell groups. The complexity of CHO at gNB is also high because all the candidate gNBs need to monitor the physical random access channel (PRACH) of the UE. The gNB also will lose control of the target gNB the UE will access if the CHO is adopted.

Furthermore, in the CHO scheme, a base station configures a UE in advance with a list of candidate cells that can be accessed when the cell is switched. When the UE detects a specific event, such as a decrease in the performance of the serving cell, the UE selects a target cell from candidate cells in the candidate cell list. The CHO scheme can reduce the cell switching delay, but it also reduces the base station's control over the target cell. In the DAPS scheme, the base station provides the UE with two cell groups corresponding to a source cell (source serving cell) and a target cell (target serving cell), respectively. Such a double connect method of the DAPS scheme allows the UE to retain communication with both the source serving cell and the target serving cell, thereby effectively improving the success rate of the cell switching procedures. The dual connection method, however, increases the complexity of the DAPS scheme.

The methods and systems implemented based on some embodiments of the disclosed technology can improve the speed, robustness, and the success rate of cell handover procedures.

In particular, the disclosed technology can be implemented in some embodiments to improve the channel performance for a UE at the edge of the cell to reduce the UE complexity and the handover delay, while improving the handover success rate.

FIG. 1 shows an example of a wireless communication system (e.g., an LTE, 5G New Radio (NR) cellular network) that includes a radio access node 120 and one or more user equipment (UE) 111, 112 and 113. In some embodiments, the downlink transmissions (141, 142, 143) include a control plane message that comprises a processing order for processing the plurality of user plane functions. This may be followed by uplink transmissions (131, 132, 133) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

This patent document uses examples from the 3GPP New Radio (NR) network architecture and 5G protocol only to facilitate understanding and the disclosed techniques and embodiments may be practiced in other wireless systems that use different communication protocols than the 3GPP protocols.

In the context of this patent document, an indefinite article "a" or "an" carries the meaning of "one or more."

EXAMPLE EMBODIMENTS

Example 1

The disclosed technology can be implemented in some embodiments to provide methods and systems for reference signaling in wireless communication networks as will be discussed below.

Figure 2:
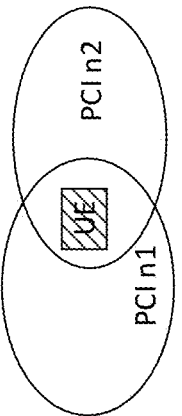
FIG. 2 shows an example of a user equipment (UE) that is located at the intersection of a first cell (cell 1) corresponding to a first physical cell identifier (PCI n1) and a second cell (cell 2) corresponding to a second physical cell identifier (PCI n2), based on some example embodiments of the disclosed technology.

FIG. 2 shows an example of a user equipment (UE) that is located at the intersection of a first cell (cell 1) corresponding to a first physical cell identifier (PCI n1) and a second cell (cell 2) corresponding to a second physical cell identifier (PCI n2), based on some example embodiments of the disclosed technology.

In the context of this patent document, the word "cell" is used to indicate the geographic area that is covered by a single network by radio waves through a local antenna in the cell, and the word "physical cell identifier" may be used to indicate the identifier of a cell in the physical layer of the wireless network. In some implementations, the physical cell identifier may be used for separation of different transmitters.

As shown in FIG. 2, when a UE moving from a first cell (cell 1) to a second cell (cell 2) is in the overlapped area between the cell 1 corresponding to the PCI n1 and the cell 2 corresponding to the PCI n2, traditional communication methods require the UE to perform cell handover operations, which involve RRC signaling, resulting in large switching delay, high switching complexity, and low success rate.

Physical cell identifier (PCI), which is the identifier of a cell in the physical layer of the wireless communication network, can be carried in a synchronization signal sequence. In handling cell handover operations associated with PCI, the methods and systems based on some embodiments of the disclosed technology can apply to multiple scenarios as will be discussed below.

Figure 3:
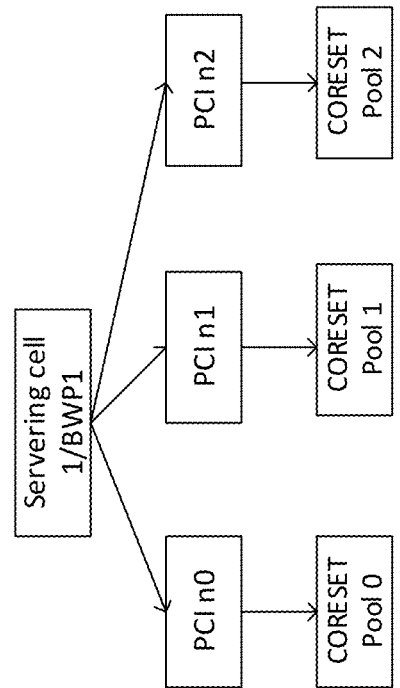
FIG. 3 shows a scenario where different control resource set (CORESET) pools correspond to different physical cell identifiers (PCIs), respectively.

FIG. 3 shows a scenario where different control resource set (CORESET) pools correspond to different PCIs, respectively. In some implementations, CORESET pool indices of the CORESETs in a CORESET pool is the same as each other. When the CORESET pool indices are not configured, they are set to 0 by default. In one implementation, The CORESET pools can include one or more CORESETs located in a serving cell. When a PCI is activated for a CORESET pool index of a serving cell through a media access control (MAC)-control element (MAC-CE), the PCI is activated in the MAC-CE for all the CORESET associated with the CORESET pool index in each bandwidth part (BWP) in the serving cell. In another implementation, the CORESET pools can include one or more CORESETs in the same BWP, and the MAC-CE configures the corresponding PCI for the CORESET pool in each BWP respectively.

Figure 4:
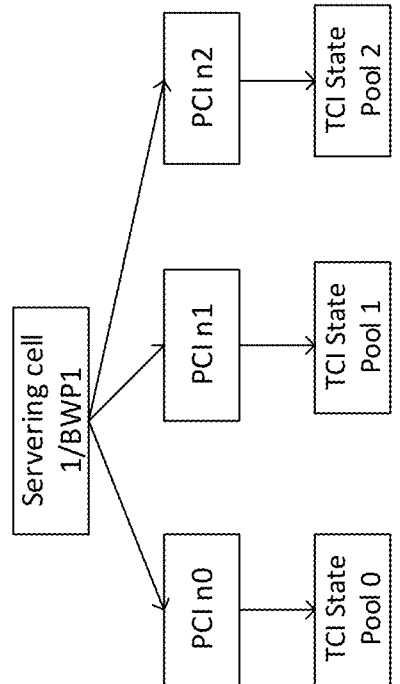
FIG. 4 shows a scenario where different transmission configuration indicator (TCI) state pools in a serving cell correspond to different physical cell identifier (PCIs), respectively.

FIG. 4 shows a scenario where different transmission configuration indicator (TCI) state pools in a serving cell correspond to different PCIs, respectively. In some implementations, the same pool index is configured in each TCI state of a TCI state pool. The PCI corresponding to a TCI state pool is activated by MAC-CE. Provided a TCI state pool corresponds to a PCI, PCI information can also be directly configured in the TCI state. The TCI state corresponding to the same PCI value constitutes a TCI state pool.

Figure 5:
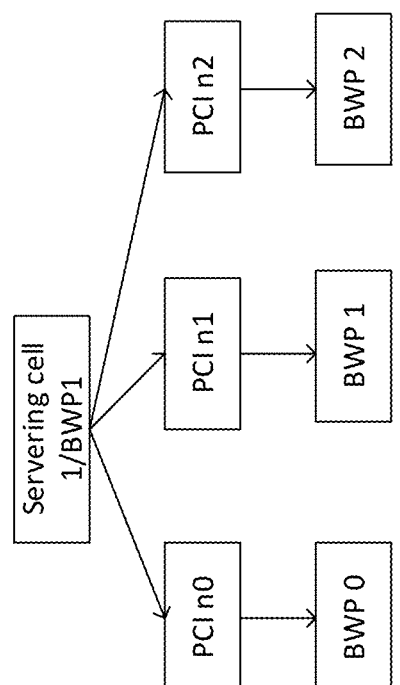
FIG. 5 shows a scenario where different bandwidth parts (BWPs) of a serving cell correspond to different PCIs, respectively.

FIG. 5 shows a scenario where different bandwidth parts (BWPs) of a serving cell correspond to different PCIs, respectively. The PCIs are activated for the BWPs through MAC-CE.

In some implementations, the BWP may correspond to a set of physical blocks selected from a contiguous resource blocks of a serving cell. There are one or more BWPs in a serving cell.

As shown in FIGS. 3-5, different PCIs can be associated with different CORESET pools and/or different TCI state pools and/or different BWPs in a serving cell. While maintaining communications with multiple physical cells under the framework of a serving cell, data of one UE can be transmitted to or received from one cell dynamically selected from the multiple cells, or the same data of one UE can be transmitted to or received from multiple cells at the same time. In this way, the methods and systems in some implementations can greatly improve the handover success rate, compared to other schemes where each PCI is associated with one serving cell and multiple PCIs correspond to multiple serving cell, because each serving cell in a media access control (MAC) layer corresponds to one hybrid automatic repeat request (HARQ) entity and one HARQ entity corresponds to a set of parallel HARQ processes. Data corresponding to the same HARQ entity may be repeatedly transmitted over the physical layer, whereas data corresponding to different HARQ entity can't be repeatedly transmitted over the physical layer. For example, the same data can be repeatedly transmitted over the physical layer by transmitting data with the same HARQ-ACK process number in a serving cell or by allowing a channel to use different beams corresponding to different PCIs to repeatedly transmit data over different frequency resources or time domain resources. The beam corresponds a TCI state or quasi co location-reference signal (QCL-RS) in the downlink. The beam corresponds to spatial relation information (Spatial Relation Info) or spatial domain transmitting in the uplink direction. Under the framework that maps each PCI to a serving cell, data of different HARQ-entities cannot be repeatedly transmitted over the physical layer. On the other hand, the cell switching doesn't involve radio resource control (RRC) signaling. The RRC signaling configures the UE with multiple elements corresponding to CORESET pools/TCI state pools/BWPs in advance. For example, when different PCIs are associated with different CORESET pools, respectively, a gNB sends a physical downlink control channel (PDCCH) to the UE from one or more CORESET pools dynamically on demand. Further, PCI is activated for CORESET pools/TCI state pools/BWPs through MAC-CE signaling, greatly reducing the handover delay. In addition, the UE does not have to support dual connectivity (DC) like the dual active protocol stack (DAPS) scheme, and the UE's implementation complexity can decrease. In FIGS. 3 to 5, a physical cell corresponding to a PCI no longer corresponds to a serving cell respectively. In the context of this patent document, the word "TRP" (transmission/reception point) is used to indicate the physical cell corresponding to a PCI.

In some embodiments of the disclosed technology, a base station and a UE determine which of scenarios (FIG. 3-FIG. 5) is adopted according to signaling of the base station or predetermined rules, that is, different PCIs correspond to different CORESET pools, or correspond to different TCI state pools, or correspond to different BWPs. In the context of this patent document, the term "base station" can be used to indicate a next generation Node B (gNB), enhanced Node B (eNB), or any other device that performs as a base station.

Figure 6:
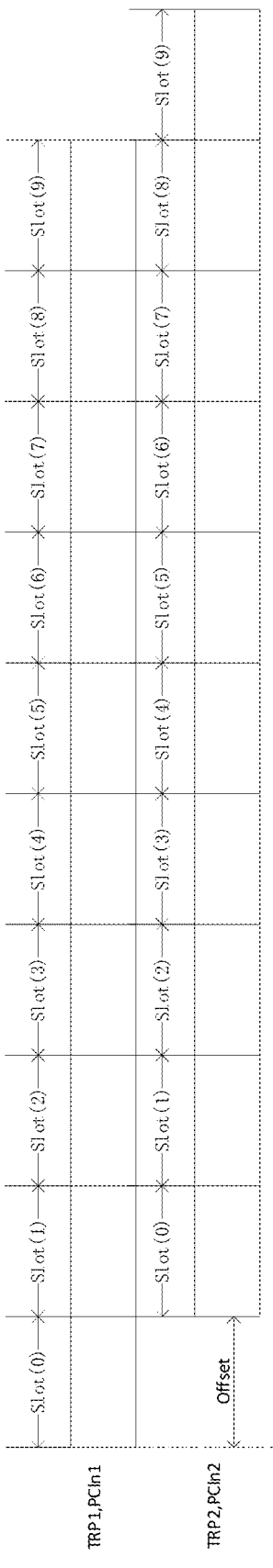
FIG. 6 shows an example of misaligned frame boundaries of physical cells corresponding to different physical cell identifiers (PCIs) where a serving cell or a bandwidth part (BWP) corresponds to multiple PCIs.

FIG. 6 shows an example of misaligned frame boundaries of physical cells corresponding to different physical cell identifiers (PCIs) where a serving cell or a bandwidth part (BWP) corresponds to multiple PCIs.

Figure 7:
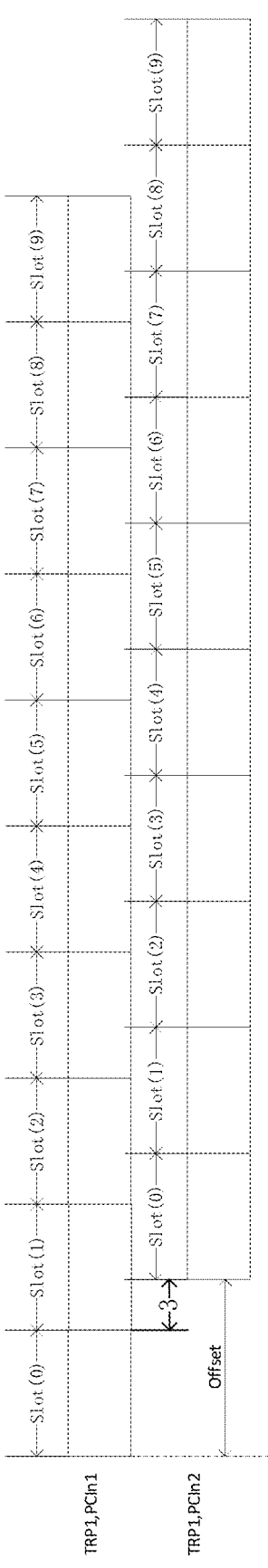
FIG. 7 shows another example of misaligned frame boundaries of physical cells corresponding to different physical cell identifiers (PCIs) where a serving cell or a bandwidth part (BWP) corresponds to multiple PCIs.

FIG. 7 shows another example of misaligned frame boundaries of physical cells corresponding to different physical cell identifiers (PCIs) where a serving cell or a bandwidth part (BWP) corresponds to multiple PCIs.

In some implementations, a serving cell or a BWP corresponds to multiple PCIs, and the frame boundaries of physical cells corresponding to different PCIs may be misaligned, as shown in FIGS. 6-7. In FIG. 6, the frame boundaries between TRPs differ by an integer multiple of slots. In one example, the frame boundaries between TRPs differ by an integer multiple of OFDM symbols. Therefore, the different channels/signals corresponding to different TRP and located in the same symbol should use different time unit indices, and especially when the channels or signals are TRP-specific channels or signals for multiple UEs in the TRP, then the parameter of the channels/signals can't be different for different UEs. One or more of the following schemes (Scheme 1-Scheme 5) can be used to address these issues.

Scheme 1

The reference signal sequence parameters are determined according to PCI. For example, the sequence parameters include a time unit index, and the time unit includes at least one of the following: frame index; subframe index; slot index; and time domain symbol index such as OFDM index. Specifically, the base station notifies the UE of the time offset between the PCI corresponding to the reference signal and a reference PCI, and determines the reference signal sequence parameters according to the PCI (i.e., the first PCI) corresponding to the reference signal. For example, the reference signal is channel state information reference signal (CSI-RS). The sequence of CSI-RS is a pseudo-random sequence, and the initial parameters of the random sequence are generated as one of the formulas below (1)-(4):

$$c_{init} = \tag{1}$$

$$\left(2^{10}\left(N_{symb}^{slot}\left(\left(n_{s,f}^{\mu} + n_{offset}^{(i)}\right)\bmod N_{slot}^{frame,\mu}\right) + l + 1\right)(2n_{ID} + 1) + n_{ID}\right)\bmod 2^{31}$$

$$c_{init} = \left(2^{10}\left(N_{symb}^{slot}\left(\left(n_{s,f}^{\mu} + n_{offset}^{(i)}\right)\right)\bmod N_{slot}^{frame,\mu} + \left(l + l_{offset}^{(i)}\right)\bmod L_{slot} + 1\right) \tag{2}$$

$$\left(2n_{ID} + 1\right) + n_{ID}\right)\bmod 2^{31}$$

$$c_{init} = \left(2^{10}\left(N_{symb}^{slot}\left(n_{s,f}^{\mu} + n_{offset}^{(i)}\right) + l + 1\right)(2n_{ID} + 1) + n_{ID}\right)\bmod 2^{31} \tag{3}$$

$$c_{init} = \left(2^{10}\left(N_{symb}^{slot}\left(n_{s,f}^{\mu} + n_{offset}^{(i)}\right) + l + l_{offset}^{i} + 1\right)(2n_{ID} + 1) + n_{ID}\right)\bmod 2^{31} \tag{4}$$

In formulas (1) and (3), the time offsets between the two PCIs are only slot offsets. In formulas (2) and (4), the time offsets between the two PCIs include slot offsets and time domain symbol offsets. For a serving cell or BWP, the UE obtains time unit index of CSI-RS based on the downlink timing corresponding to the reference PCI $$n_{s,f}^{\mu},$$

l, where μ is the subcarrier spacing parameter of the CSI-RS, that is, the subcarrier spacing of the CSI-RS is $$15 \text{ kHz} * 2^{\mu} \cdot n_{s,f}^{\mu}$$

is the slot index in a frame where the CSI-RS is located, l is the time domain symbol index in a slot with the CSI-RS, $$N_{slot}^{frame,\mu}$$

is the number of slots included in a frame and $L_{slot}$ is the number of time domain symbols in a slot, $n_{ID}$ is the virtual cell index which is configured for the UE, or is the PCI when the base station is not configured. i in formulas (1-4) is the relative index of the PCI corresponding to the reference signal among multiple PCIs of one serving cell or BWP. The slot index and/or time domain symbol index of the reference signal corresponding to different i are different. For example, a serving cell in FIG. 3 corresponds to three PCIs, {PCI n0=PCI 1000, PCI n1=PCI 8, PCI n2=PCI89}, where i for {PCI n0, PCI n1, PCI n2} is 0, 1, and 2, respectively.

The reference PCI is obtained according to one or more of the following information of the reference PCI: PCI, serving cell index, absolute radio frequency channel number (ARFCN), or Mobility Object ID configured by gNB, or the reference PCI is the PCI corresponding to one serving cell which is one of Pcell, PScell, and the serving cell of the CSI-RS. When a serving cell corresponds to multiple PCIs as shown in FIGS. 3-5, the base station informs which PCI is the reference PCI, or reserves the first PCI as the reference PCI, or when the serving cell is SPcell, PCI selected in random access by the UE is the reference PCI. Here, SpCell indicates a primary cell of a master or secondary cell group, PCell indicate SpCell of a master cell group, and PSCell indicates SpCell of a secondary cell group.

In formulas (1) to (4) for the CSI-RS corresponding to reference PCI, $$n_{offset}^{i} = 0, l_{offset}^{i} = 0.$$

Further, $$n_{offset}^{i}, l_{offset}^{i}$$

in formulas (1) to (4) for CSI-RS corresponding to other PCI may be obtained based on the signaling information notified by the base station and/or based on the information fed back by the UE to the base station.

For example, PCI n1 is used as the reference PCI in FIGS. 6-7.

$$n_{offset}^{i} = -1$$

in formulas (1) to (4) for the reference signal corresponds to PCI n2 in FIG. 6.

$$n_{offset}^{i} = -1, l_{offset}^{i} = -3$$

in formulas (1) to (4) for the reference signal corresponding to PCI n2 in FIG. 7. As shown in FIG. 7, the timing difference between PCI n2 an PCI n1 is a slot plus 3 time-domain symbols such as OFDM symbol.

On the UE side, only one downlink timing needs to be obtained based on the reference PCI for a serving cell. The UE receives the channel or signals corresponding to multiple PCIs in the serving cell according to the one downlink timing. The UE gets the time domain location of channels/signals according to the signaling information in DCI or RRC/MAC-CE, wherein the time domain location is only based on the one downlink timing regardless the PCI of channels/signals. Only the time unit index used in the sequence generation of the reference signal corresponding to different PCI(s) are different. Alternatively, $$n_{offset}^i, l_{offset}^i$$

is time difference at the TRP. The UE gets the receiving timing for receiving signals/channels of each PCI according to synchronization signal corresponding to each PCI. The offset of the slot with the same index between two TRPs two TRPs to the UE is 1 slot+0.003 ms, that is, the UE needs to get multiple downlink timings for multiple PCI. The receiving timing difference between multiple PCI at the UE is $$n_{offset}^i + \Delta$$

in FIG. 6, wherein $\Delta$ is obtained by UE using the synchronization signal of each PCI.

Scheme 2

At least one of the following formulas (5)-(6) may be used to obtain the CSI-RS sequence:

$$c_{init} = \left(2^{10}\left(N_{symb}^{slot}n_{s,f,i}^\mu + l\right) + 1\right)(2n_{ID} + 1) + n_{ID})\bmod 2^{31} \qquad (5)$$

$$c_{init} = \left(2^{10}\left(N_{symb}^{slot}n_{s,f,i}^\mu + l_i\right) + 1\right)(2n_{ID} + 1) + n_{ID})\bmod 2^{31} \qquad (6)$$

Here, the base station does not notify the UE of the timing difference between the TRPs, and the UE calculates the slot index and the time domain symbol index corresponding to each PCI relative index i according to the downlink synchronization signal corresponding to each PCI relative index i. The UE maintains a downlink timings for each PCI, and the complexity of the UE is relatively high. The downlink timing offsets corresponding to different PCIs may not be integer multiple of OFDM symbols or integer multiple of slots.

With the above solution, when multiple PCIs correspond to one serving cell, a PCI of a reference signal is determined. The time unit indices obtained on the PCI is used for generating sequences of the reference signal and for determining the location of the reference signal. The time domain unit indices of reference signals corresponding to different PCIs on the same time domain symbol are different.

Scheme 3

When the reference signal sequence is generated, it does not depend on slot index. For example, the method shown in formula (7) is used. Here, if the downlink timing offset between PCIs is the product of any integer and the width of a slot.

$$c_{init} = \left(2^{10}(l) + 1\right)(2n_D + 1) + n_D)\bmod 2^{31} \qquad (7)$$

Scheme 4

When the reference signal sequence is generated, it does not depend on the slot index and time domain symbol index, as expressed in one of formulas (8) and (9):

$$c_{init} = \left(2^{10} + 1\right)(2n_{ID} + 1) + n_{ID})\bmod 2^{31} \qquad (8)$$

$$c_{init} = (2^{10}\left\lfloor\frac{l}{L}\right\rfloor + 1)(2n_{ID} + 1) + n_{ID})\bmod 2^{31} \qquad (9)$$

where L is a number smaller than 14, or L is the time domain OFDM number in a sub-slot, such as L belongs {2, 4, 7}.

Scheme 5

Use formulas (10) to obtain the CSI-RS sequence. When a serving cell or BWP is associated with multiple PCIs, the frame boundaries corresponding to the different PCIs are aligned. The multiple PCIs associated with and activated for one serving cell or BWP includes the PCIs associated with multiple CORESET pools and/or TCI state pools and/or BWPs as shown in FIGS. 2 to 4. Alternatively, the multiple PCIs for one serving cell includes the PCIs activated for the serving cell by MAC-CE.

$$c_{init} = \left(2^{10}\left(N_{symb}^{slot}n_{s,f}^\mu + l\right) + 1\right)(2n_{ID} + 1) + n_{ID})\bmod 2^{31} \qquad (10)$$

In an embodiment, it is determined by UE or gNB which of (1) to (10) is used according to signaling information or a predetermined rule. For example, when the maximum number of PCIs activated by a serving cell is one, formula (10) is used, Otherwise, according to the signaling information, it can be determined whether the downlink timings corresponding to multiple PCIs activated for a serving cell are aligned. When aligned, the formula (10) is used, and when not aligned, one of the formulas (1)-(9) is used.

When one of the formulas (1)-(9) is used, the PCI relative index i in the formulas (1)-(9) corresponding to the CSI-RS needs to be determined by one of the following methods:

Alternative Method 1

If different PCIs are associated with different CORESET pools as shown in FIG. 3, the PCI relative index i of the CSI-RS is obtained according to the PCI corresponding to the CORESET pool which includes the physical downlink control channel (PDCCH) scheduling the CSI-RS. The PCI relative index i for semi-persistent CSI-RS/periodical CSI-RS can be configured through higher layer signaling. If it is not configured, the PCI relative index i for semi-persistent CSI-RS/periodical CSI-RS is set to, for example, 0 as a default value.

Alternative Method 2

If different PCIs are associated with different TCI state pools as shown in FIG. 4, the PCI relative index i of the CSI-RS is determined according to the TCI state pool including the TCI state of the CSI-RS. Alternatively the PCI relative index i of the CSI-RS is determined according to the TCI state of the CSI-RS.

Alternative Method 3

If different PCIs are associated with different BWPs as shown in FIG. 5, the PCI relative index i of the CSI-RS is determined according to the BWP where the CSI-RS is located. For example, the PCI relative index i is the PCI corresponding to an activated BWP.

The time unit offset between the two PCI {PCI n1, PCI n2} includes one of the following: the offset between the start of slot 0 corresponding to PCI n1 and the start of the nearest slot 0 corresponding to PCI n2; the offset between a slot start corresponding to PCI n1 and a nearest slot start corresponding to PCI n2; the offset between the start of frame k of PCI n1 and the start of frame k of PCI n2; the offset between the start of subframe k of PCI n1 and the start of subframe k of PCI n2; the offset between the frame start of PCI n1 and the start of the nearest frame of PCI n2; the start of slot 0 for PCI n1 coincides with the start of slot $$n^i_{offset}$$

for PCI n2; the start of slot 0 for PCI n1 coincides with the start of OFDM $$l^i_{offset}$$

in slot $$n^i_{offset}$$

for PCI n2.

In the above example embodiments, CSI-RS is discussed as an example of the reference signal. The above method is also applicable to one or more of the following reference signals: SSB, DMRS, PT-RS, tracking reference signal (TRS) (also a CSI-RS). For the slot index of the channel, the time unit offset between multiple PCIs can also be considered similarly. For example, the time unit indices used for different PDSCHs are different on the same time frame.

In an embodiment, it is determined whether the frame boundaries corresponding to multiple PCIs for a serving cell or a BWP are aligned through signaling information notifications. When the signaling information indicates that the frame boundaries corresponding to multiple PCIs in a serving cell or a BWP are not aligned, the timing of each PCI can be based on the synchronization signal or CSI-RS of each PCI. The timing of one reference signal is based on the timing of the synchronization signal or CSI-RS of the PCI associated with the reference signal. The time unit index used for generating the reference signal sequence corresponding to each PCI is obtained according to the timing of each PCI. When the signaling information indicates that the frame boundaries corresponding to multiple PCIs in a serving cell or a BWP are aligned, all the timings of the PCIs associated with a serving cell are the same as one another. The time unit index used for generating the reference signal sequence corresponding to all PCIs is obtained according to the timing of any one PCI.

Figure 8:
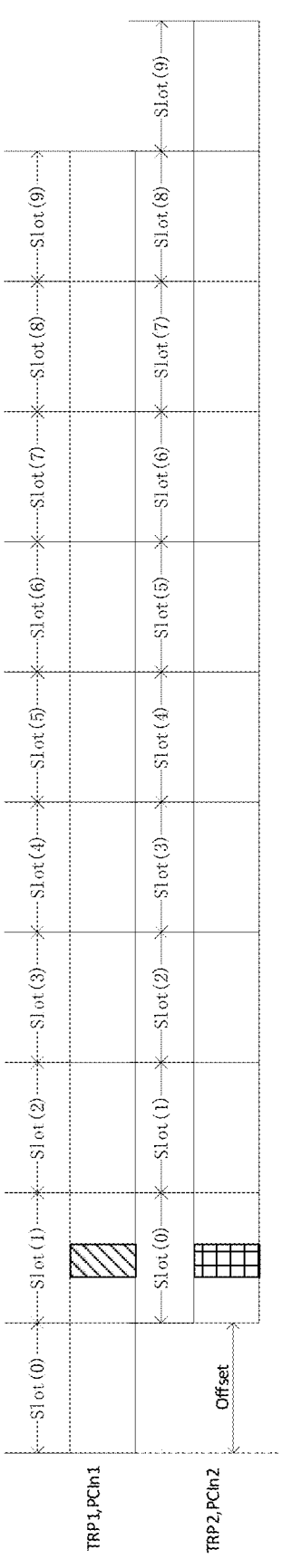
FIG. 8 shows another example of misaligned frame boundaries of physical cells corresponding to different physical cell identifiers (PCIs) where the time offset between two different PCIs is one slot and two channel state information reference signal (CSI-RS) resources corresponding to the two different PCIs, respectively, are located on the same absolute time domain symbol.

FIG. 8 shows another example of misaligned frame boundaries of physical cells corresponding to different physical cell identifiers (PCIs) where the time offset between two different PCIs is one slot and two channel state information reference signal (CSI-RS) resources corresponding to the two different PCIs, respectively, are located on the same absolute time domain symbol.

In an embodiment, the time unit offsets corresponding to different PCIs are only used for generating the reference signal sequence as shown in formulas (1)-(9), and the time unit index corresponding to time domain resources where reference signals of different PCIs are located are the same. In another embodiment, the above time unit offsets corresponding to different PCIs are used both for generating reference signal sequence as shown in formula (1-9) and for determining time domain resources location of the reference signal.

As shown in FIG. 8, the time offset between the two PCIs is one slot and two CSI-RS resources corresponding to the two PCIs, respectively, which are located on the same absolute time domain symbol. The time unit index used for determining the time domain resource of the two CSI-RS resources is the same as each other, and thus both the two CSI-RS resources locate on OFDM 3 of slot 1 based on the timing of PCI n1. However, the time unit index used in the CSI-RS1 sequence generation as shown in one of the formulas (1)-(8) is {slot1, OFDM3}, and the time unit index used in the CSI-RS1 sequence generation as shown in one of the formulas (1)-(8) is {slot0, OFDM3}.

In an embodiment, when the frequency of the synchronization signals of the two PCIs are the same, it is determined whether the frame boundaries between the multiple PCIs are aligned according to the system message or the configuration information in the Mobility measurement. When the frequency of the synchronization signals of the two PCIs is different, it is determined whether the frame boundaries between multiple PCIs are aligned according to a signaling, which is UE-specific signaling or Cell-specific signaling.

In an embodiment, when the target receiving end of the uplink reference signal in a serving cell or BWP corresponds to different PCIs, one or more of the schemes 1-5 discussed above can be used to determine the time unit index used for the uplink reference signal sequence generation. The PCI of an uplink reference signal is determined using one or more of the alternative methods 1-3 discussed above.

In an embodiment, the uplink timing difference and the downlink timing difference between different PCIs of a serving cell are the same as one another.

In another embodiment, the uplink timing difference and the downlink timing difference between different PCIs of a serving cell are different from one another. In one example, the uplink timing difference and the downlink timing difference between different PCIs of a serving cell are separately configured by a gNB.

In an embodiment, the timing difference between multiple PCIs of a serving cell associated with different subcarrier spacing is different from one another. The gNB can configure a UE timing difference between multiple PCIs associated with one reference subcarrier spacing. The timing offset in the formulas (1) to (9) is $$n^{i,\mu}_{offset} = 2^{\mu_{refemce} - \mu} n^i_{offset}, \quad l^{i,\mu}_{offset} = 2^{\mu_{refemce} - \mu} l^i_{offset}$$

where the $\mu_{reference}$ is for the reference subcarrier spacing and p is for the subcarrier spacing of the reference signal such as CSI-RS. Alternatively, the gNB configures the UE timing difference between multiple PCIs for each subcarrier spacing respectively.

In an embodiment, the reference subcarrier spacing is the smallest among the multiple subcarrier spacings of a serving cell.

As such, the methods and systems implemented based on some embodiments of the disclosed technology can improve the speed, robustness, and the success rate of cell handover procedures, enabling a UE to maintain communication with multiple TRPs simultaneously under a serving cell framework.

In an embodiment, the UE reports the maximum number of PCIs that can be activated for a serving cell. This capability parameter may be on a serving cell basis or on a radio band basis. The maximum number of PCIs activated in a serving cell in FIGS. 3 to 5 is 3, and this embodiment did not exclude the maximum number is another number, for example, 1 or 2.

Example 2

In some embodiments of the disclosed technology, the BWP switching delay depends on the relationship between PCI of new BWP and PCI of old BWP. For example, the BWP switching delay needs to consider whether the PCI of the old BWP and the PCI of the newly activated BWP are the same. The switching delay is the first time length when the two PCIs are the same. The switching delay is the second time length when the two PCIs are different. Further, the first time length is less than or equal to the second time length. The UE does not receive/transmit the channel or signal in the serving cell during the switching delay. The switching delay is the minimum time interval from the end of a PDCCH including the indication of the new BWP to the start of the time the new BWP is activated. A UE does not expect to detect downlink control information (DCI) indicating changes in an active downlink bandwidth part (DL BWP) with the corresponding time domain resource assignment field providing a slot offset value for a physical downlink shared channel (PDSCH) reception or a physical uplink shared channel (PUSCH) transmission that is smaller than the switching delay. The PCI of a BWP includes the PCI associated with the BWP as shown in FIG. 4. The PCI of a BWP also includes the PCI associated with one or more CORESETs in the BWP as shown in FIG. 2. The PCI of a BWP also includes the PCI associated with one or more TCI states configured for the BWP as shown in FIG. 3. The PCI of a BWP includes one or more PCIs.

Example 3

In some embodiments of the disclosed technology, the transmission configuration indicator (TCI) states of the PDSCH are activated by a media access control element (MAC-CE) The TCI states included in the MAC-CE become activated in the first slot after $3+T_{offset}$ ms since the transmission by the UE of the ACK for the PDSCH including the MAC-CE. $T_{offset}$ is determined according to the PCI of the TCI state. If a set of PCIs of the activated TCI states in the MAC-CE belongs to a set of PCIs of the old TCI states of PDSCH before the MAC-CE activation, $T_{offset}$ equals 0, otherwise $T_{offset}$ is a value greater than 0. $T_{offset}$ can be a predetermined value or a capability value reported by the UE, or a value notified by the gNB. The PCI set of the TCI states of PDSCH includes the PCI of every TCI state in the TCI states of PDSCH. The TCI states of PDSCH activated by MAC-CE can be directly used for PDSCH, or there is a mapping relationship between the TCI states activated by MAC-CE and the TCI codepoints in the PDCCH, and the PDCCH indicates the TCI states of PDSCH.

Similarly, the delay between the application of another parameter included in a MAC-CE and the ACK of PDSCH including the MAC-CE depends on the relationship between the PCI of the old value of the other parameter and the PCI of the new value of the other parameter. For example, the other parameter includes path loss reference signal. The new path loss reference signal activated by the MAC-CE is applied in the first slot after $(3+T_{offset})$ ms after the UE transmits the ACK for the PDSCH including the MAC-CE. If the PCI set of the new activated path loss reference signal in the MAC-CE belongs to the PCI set of the old path loss reference signal before the MAC-CE activation, $T_{offset}$ equals 0, otherwise $T_{offset}$ is a value greater than 0.

Similarly, the delay between the application of the new parameter in a DCI and the end of the DCI depends on the relationship between the PCI of the old parameter and the PCI of the new parameter included in the DCI.

Example 4

In some embodiments of the disclosed technology, the quasi-co-location reference signal of the target reference signal in the serving cell is a mobility measurement reference signal, such as the SSB of the neighboring cell, or the CSI-RS measurement reference signal configured in the mobility object.

In an embodiment, the mobility measurement reference signal can be the quasi-co-location reference signal of the target reference signal only when the target reference signal is CSI-RS for tracking (i.e., trs-Info in the CSI-RS set is true). For example, only the TCI state of CSI-RS for tracking can include at least one of the following information: PCI, absolute radio frequency channel number (ARFCN), CSI-RS resource index for mobility, and mobility object index. When the TCI state for other target reference signals does not include above information.

Example 5

When there are multiple PCIs for a serving cell, different PCIs correspond to different mobility measurement reference signals. When the channel quality of the serving cell is estimated and reported by the UE, it needs to select one or more PCI from the multiple PCIs to determine the channel quality of the serving cell, wherein the channel quality of the serving cell is based on the mobility measurement reference signals of the selected PCI(s).

For example, if the UE is supposed to report the reference signal received power (RSRP)/reference signal received quality (RSRQ)/signal-to-interference-plus-noise ratio (SINR) of a serving cell to gNB in mobility measurement, the UE determines the PCI such that the mobility measurement reference signals of the PCI are used for the RSRP/RSRQ/SINR of the serving cell. The UE determines the PCI is the one activated for the serving cell. If there is more than one activated PCI for the serving cell, the UE further determines one activated PCI whose mobility measurement reference signals is used for the channel quality of the serving cell from the multiple activated PCIs in a first method. The PCI for the channel quality of the serving cell is one of the following PCI: the PCI with lowest PCI index in the multiple activated PCI, the PCI selected by the physical random access channel (PRACH), the PCI which is used for determining the monitoring occasion for the search space 0, or the PCI of the quasi co-location for the search space 0. The channel quality of the serving cell can also be based on the mobility measurement reference signals of all the activated PCIs for the serving cell in a second method. The UE can obtain the channel quality of the serving cell for each activated PCIs and report the channel quality for each activated PCIs in the third method, or reports the average channel quality of the multiple activated PCIs as the channel quality of the serving cell.

Example 6

When a serving cell corresponds to multiple PCIs, it needs to determine which PCI is used for obtaining the first common information by the UE and/or gNB. The first common information includes at least one of the following: PBCH, the information of CORESET0, the monitoring occasion of search space 0, quasi co-location reference signal of search space 0, the monitoring occasion of common search space, the time resource of common search space, system information, or random access resource parameters. For example, a PCI corresponds to a group of SSB indices, and there is a predetermined relationship between the SSB index and the first common information. For example, if the SSB of PCI n1 and the SSB of PCI n2 in FIG. 2 have the same frequency and the frame boundaries of the two PCIs are aligned, the information of CORESET0 included in the PBCH corresponding to the two PCIs needs to be distinguishable, and the frequency resource of the two CORESET0 of the two PCIs should be different from one another, or the frequency resource of the two CORESET0 of the two PCIs should be different from one another. The UE obtains the system information based on PDSCH scheduled by the PDCCH in the CORESET0 associated with one PCI from the multiple PCIs associated with severing cell.

The UE and/or the gNB can obtain the PCI for obtaining the first common information using at least one of following solution.

Solution 1: When there are multiple activated PCIs of the serving cell, the first common information corresponding to the respective PCIs is acquired by the UE according to each activated PCI.

Scenario 2: There is only one PCI in the servicing cell that is activated at a given time, and the first common information is obtained according to the activated PCI.

Solution 3: When there are multiple activated PCIs of the serving cell, the UE and/or gNB can determine which PCI among the activated multiple PCIs is used to obtain the first common information according to signaling information or a predetermined rule. For example, the one PCI for obtaining the first common information is as follows: PCI selected during random access, PCI selected according to signaling information notified by the base station, PCI corresponding to the lowest PCI index, PCI corresponding to the highest PCI index.

Example 7

When a serving cell corresponds to multiple PCIs, the UE needs to determine a mapping relationship between the plurality of physical cell identifiers and M fourth parameters (where M is positive integer). The fourth parameters include at least one of following information: RNTI (Radio Network Temporary Identifier); the association between RACH resources and SSB(s); the association between RACH resources and UE-specific CSI-RS configuration(s); common RACH resources; and system information. For example, the RNTI includes at least one of C-RNTI, MCS-C-RNTI, SP-CSI-RNTI, SI-RNTI, RA-RNTI, or CS-RNTI, SP-CSI-RNTI (Semi-Persistent CSI RNTI), SFI-RNTI (Slot Format Indication RNTI), CS-RNTI (Configured Scheduling RNTI), CI-RNTI (Cancellation Indication RNTI).

Figure 9:
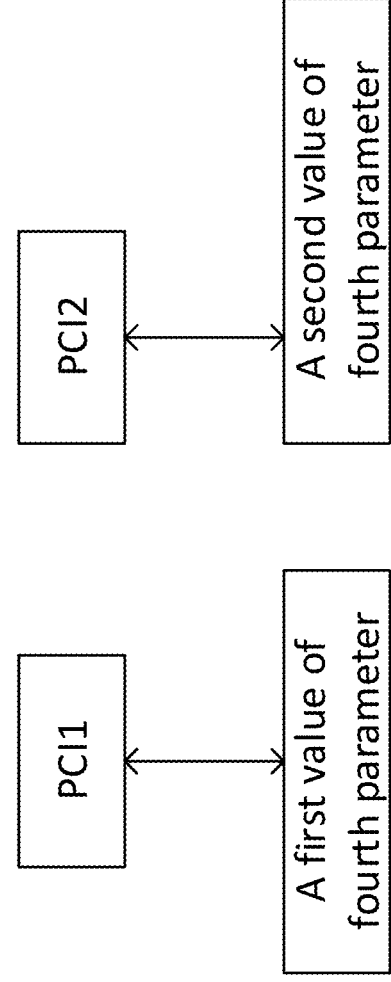
FIG. 9 shows a scenario where each of the PCI is associated with a fourth parameter respectively.

For example, the number of the plurality of physical cell identifiers of a serving cell equals the M, i.e., each of the PCI is associated with a fourth parameter respectively as shown in FIG. 9. The M can also be smaller than the number of the plurality of physical cell identifiers, where more than one physical cell identifier is associated with one fourth parameter.

Figure 10:
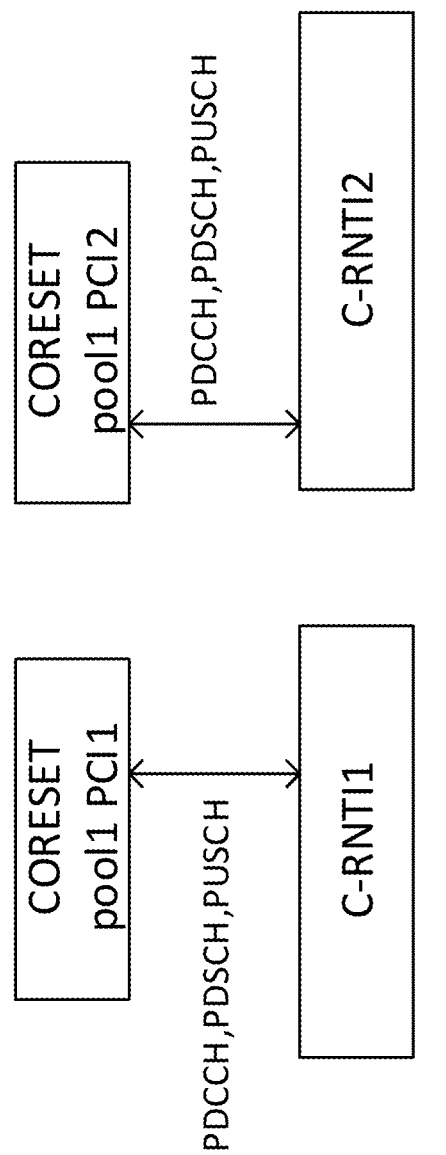
FIG. 10 shows a scenario where a different PCI corresponds to a different CORESET pool in a BWP and a C-RNTI for PUSCH/PDSCH/PDCCH associated with different CORESET pool are different.

For example, a different PCI corresponds to a different CORESET pool in a BWP and the fourth parameter includes C-RNTI as shown in FIG. 10, then scrambling sequence of the PDSCH/PUSCH scheduled by the CORESET pool 1 is C-RNTI1, and scrambling sequence of the PDSCH/PUSCH scheduled by the CORESET pool 2 is C-RNTI2. The scrambling sequence of the PDCCH in the CORESET pool 1 also is using C-RNTI1, and the scrambling sequence of the PDCCH in the CORESET pool 2 also is using C-RNTI2.

Figure 11:
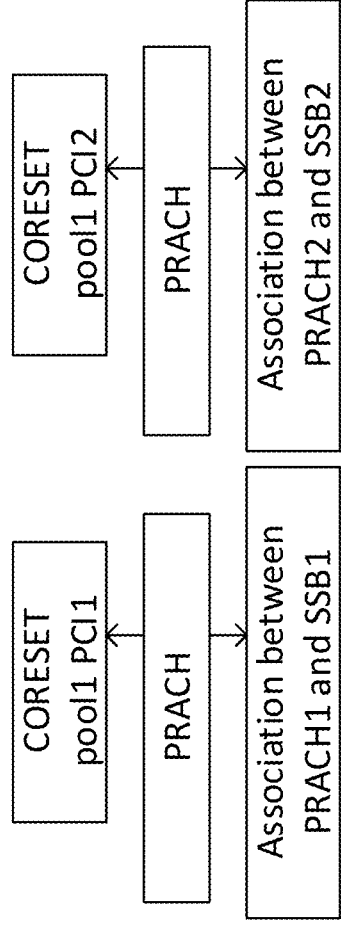
FIG. 11 shows another scenario where a different PCI corresponds to a different CORESET pool in a BWP and the PRACH associated with different CORESET pool is transmitted according to different association between RACH and SSB.

For example, a different PCI corresponds to a different CORESET pool in a BWP as shown in FIG. 11 and the fourth parameter includes C-RNTI association between RACH resources and SSB(s) as shown in FIG. 11. The association between RACH resources and SSB(s) of a different CORESET pool is determined, respectively, i.e., the PRACH associated with CORESET pool 1 will be transmitted by the wireless device according to a first association between PRACH1 and SSB1, and the PRACH associated with CORESET pool 2 will be transmitted by the wireless device according to a second association between PRACH2 and SSB2.

In some embodiments of the disclosed technology, when the PCI corresponding to the serving cell is updated by MAC-CE, after the PCI is updated, the first common information is obtained according to one or more PCIs of the new activated PCIs. Alternatively, after the PCI is updated, the UE needs to re-acquire the first common information, for example, the previous system message is considered invalid, and the system message needs to be re-acquired based on the new PCI.

In some embodiments of the disclosed technology, a wireless communication method includes determining the PCI corresponding to the channel or signal and determining the channel or signal parameters according to the PCI. The parameters of the signal include parameters for generate the signal sequence. The parameters for generating the signal sequence include one of the following: the time unit index for the signal sequence generation function, or whether the time unit index of predetermined type is included in the signal sequence generation function.

In some embodiments of the disclosed technology, only the quasi-co-location reference signal of TRS is the mobility measurement reference signal, or at least one of the following information can be configured in the TCI state of the TRS: PCI, serving cell, ARFCN, mobility object, CSI-RS for mobility.

In some embodiments of the disclosed technology, the UE can report the capability of the maximum number of PCIs activated by a serving cell.

In some embodiments of the disclosed technology, the BWP switch delay depends on the PCI, and/or the time when MAC-CE signaling becomes available depending on PCI.

In some embodiments of the disclosed technology, the mobility measurement result of a serving cell is determined according to the mobility measurement reference signals corresponding to one or more activated PCI of the serving cell.

In some embodiments of the disclosed technology, a wireless communication method includes determining the PCI to obtain the first information, where the first information includes at least one of the following: PBCH, CORESET0 information, the monitoring occasion of search space 0, quasi co-location reference signal for search space 0, the monitoring occasion of common search space, the time domain resources of common search space, system messages, or random access resource parameters.

Figure 12:
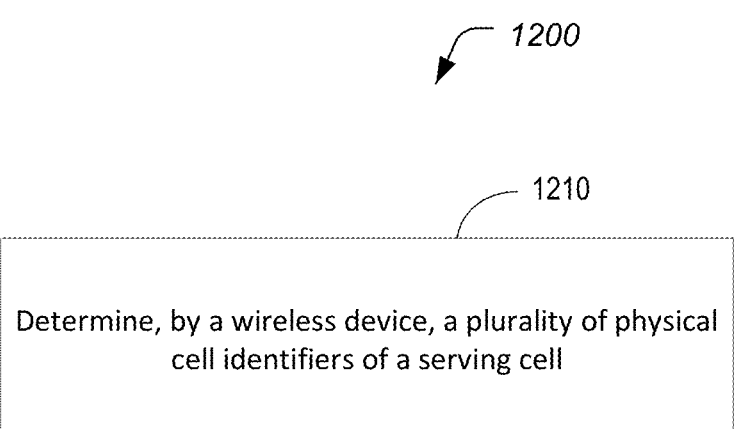
FIG. 12 shows an example of a wireless communication method based on some embodiments of the disclosed technology.

FIG. 12 shows an example of a wireless communication method based on some embodiments of the disclosed technology.

In some embodiments of the disclosed technology, a wireless communication method 900 includes, at 1210, determining, by a wireless device, one or more physical cell identifiers corresponding to a channel or a signal.

Figure 13:
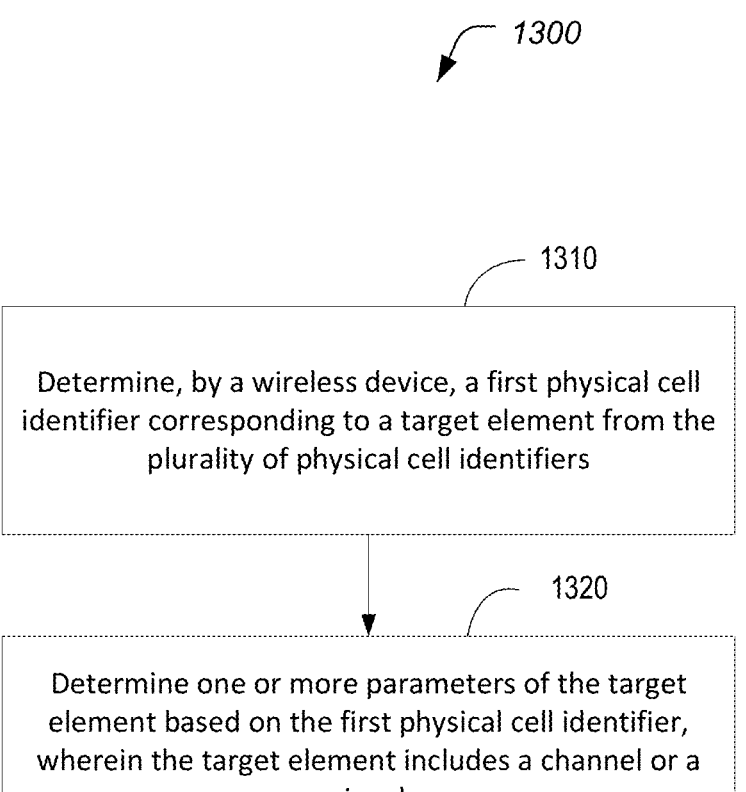
FIG. 13 shows an example of a wireless communication method based on some embodiments of the disclosed technology.

FIG. 13 shows an example of a wireless communication method based on some embodiments of the disclosed technology.

In some embodiments of the disclosed technology, a wireless communication method 1300 includes, at 1310, determining, by a wireless device, a first physical cell identifier corresponding to a target element from the plurality of physical cell identifiers, and at 1320, determining one or more parameters of the target element based on the first physical cell identifier, wherein the target element includes a channel or a signal.

Figure 14:
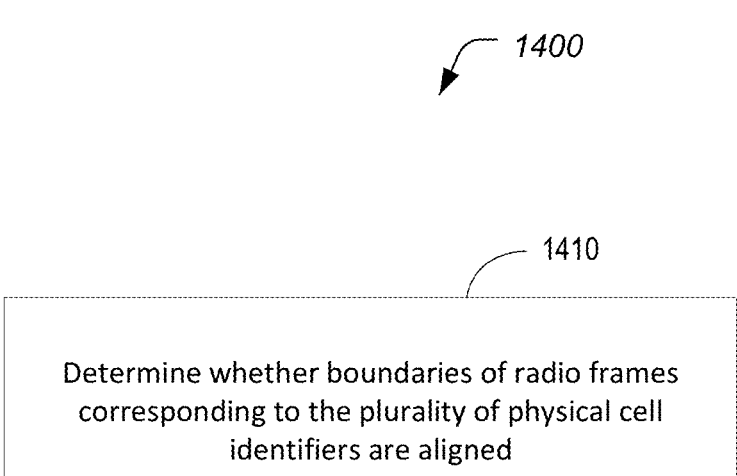
FIG. 14 shows an example of a wireless communication method based on some embodiments of the disclosed technology.

FIG. 14 shows an example of a wireless communication method based on some embodiments of the disclosed technology.

In some embodiments of the disclosed technology, a wireless communication method 1400 includes, at 1410, determining whether boundaries of radio frames corresponding to the plurality of physical cell identifiers are aligned.

Figure 15:
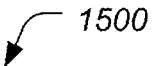
FIG. 15 shows an example of a wireless communication method based on some embodiments of the disclosed technology.

FIG. 15 shows an example of a wireless communication method based on some embodiments of the disclosed technology.

In some embodiments of the disclosed technology, a wireless communication method 1500 includes, at 1510, determining a bandwidth part switching delay based on a relationship between a third physical cell identifier of a newly activated bandwidth part and to a second physical cell identifier of an old bandwidth part.

Figure 16:
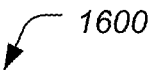
FIG. 16 shows an example of a wireless communication method based on some embodiments of the disclosed technology.

FIG. 16 shows an example of a wireless communication method based on some embodiments of the disclosed technology.

In some embodiments of the disclosed technology, a wireless communication method 1600 includes, at 1610, determining a time of applying a new parameter in a signaling according to a relationship between a fourth physical cell identifier of a parameter included in the signaling and a fifth physical cell identifier of an old parameter.

Figure 17:
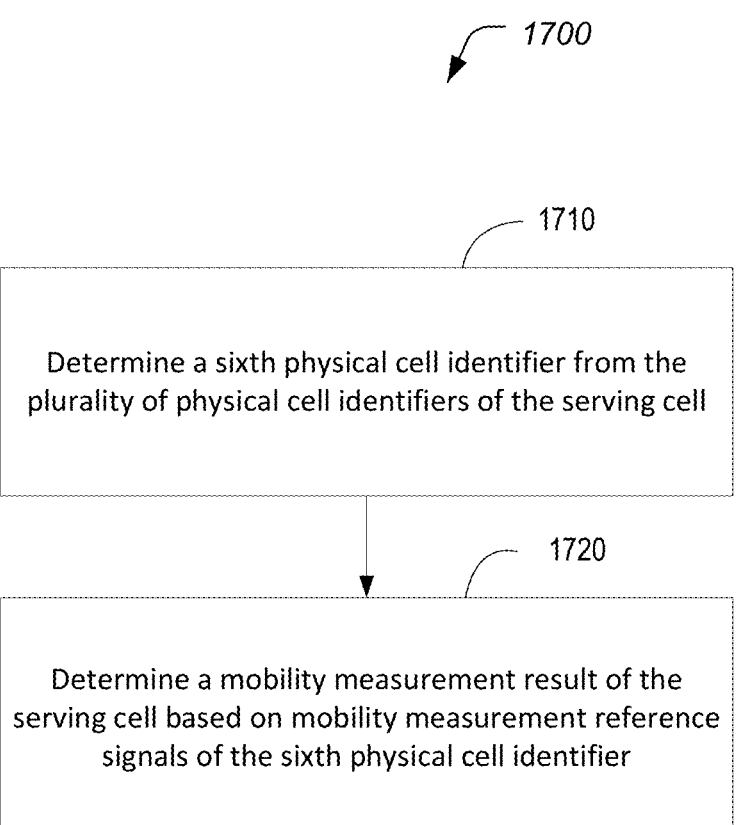
FIG. 17 shows an example of a wireless communication method based on some embodiments of the disclosed technology.

FIG. 17 shows an example of a wireless communication method based on some embodiments of the disclosed technology.

In some embodiments of the disclosed technology, a wireless communication method 1700 includes, at 1710, determining a sixth physical cell identifier from the plurality of physical cell identifiers of the serving cell, and at 1720, determining a mobility measurement result of the serving cell based on mobility measurement reference signals of the sixth physical cell identifier.

Figure 18:
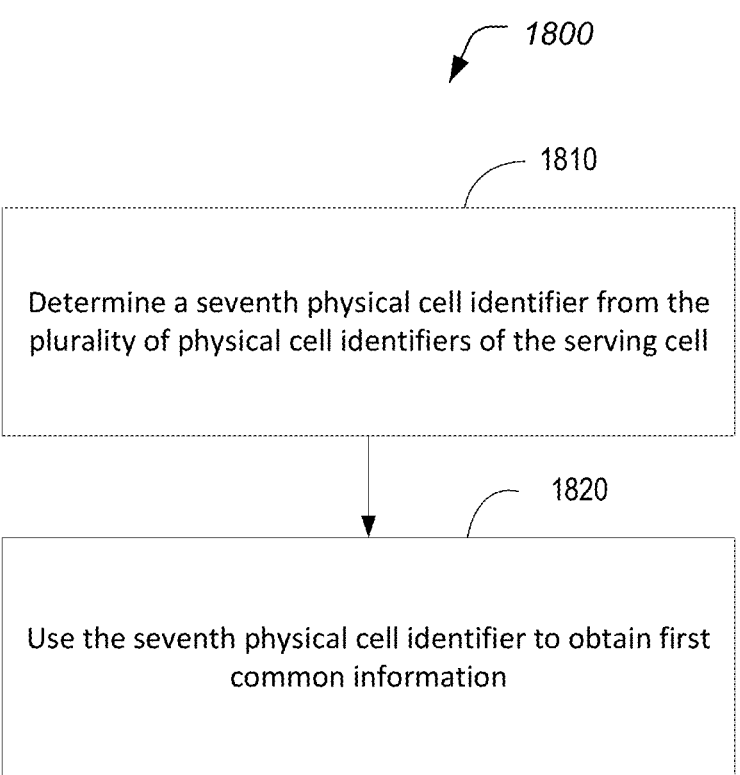
FIG. 18 shows an example of a wireless communication method based on some embodiments of the disclosed technology.

FIG. 18 shows an example of a wireless communication method based on some embodiments of the disclosed technology.

In some embodiments of the disclosed technology, a wireless communication method 1800 includes, at 1810, determining a seventh physical cell identifier from the plurality of physical cell identifiers of the serving cell, and at 1820, using the seventh physical cell identifier to obtain first common information.

FIG. 19 shows an example of a wireless communication method based on some embodiments of the disclosed technology.

In some embodiments of the disclosed technology, a wireless communication method 1900 includes, at 1910, determining a mobility reference signal as a quasi-co-location reference signal of a target reference signal in the serving cell, wherein the mobility reference signal is associated with one of the plurality of physical cell identifiers of the serving cell.

Figure 20:
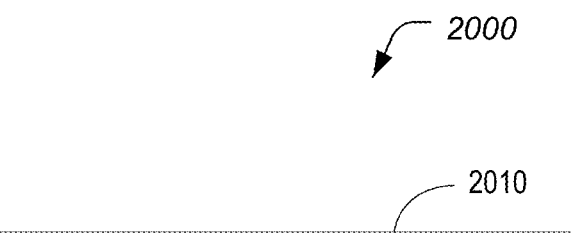
FIG. 20 shows an example of a wireless communication method based on some embodiments of the disclosed technology.

FIG. 20 shows an example of a wireless communication method based on some embodiments of the disclosed technology.

In some embodiments of the disclosed technology, a wireless communication method 2000 includes, at 2010, determining a mobility measurement reference signal as a quasi-co-location reference signal of a target reference signal in a serving cell.

Figure 21:
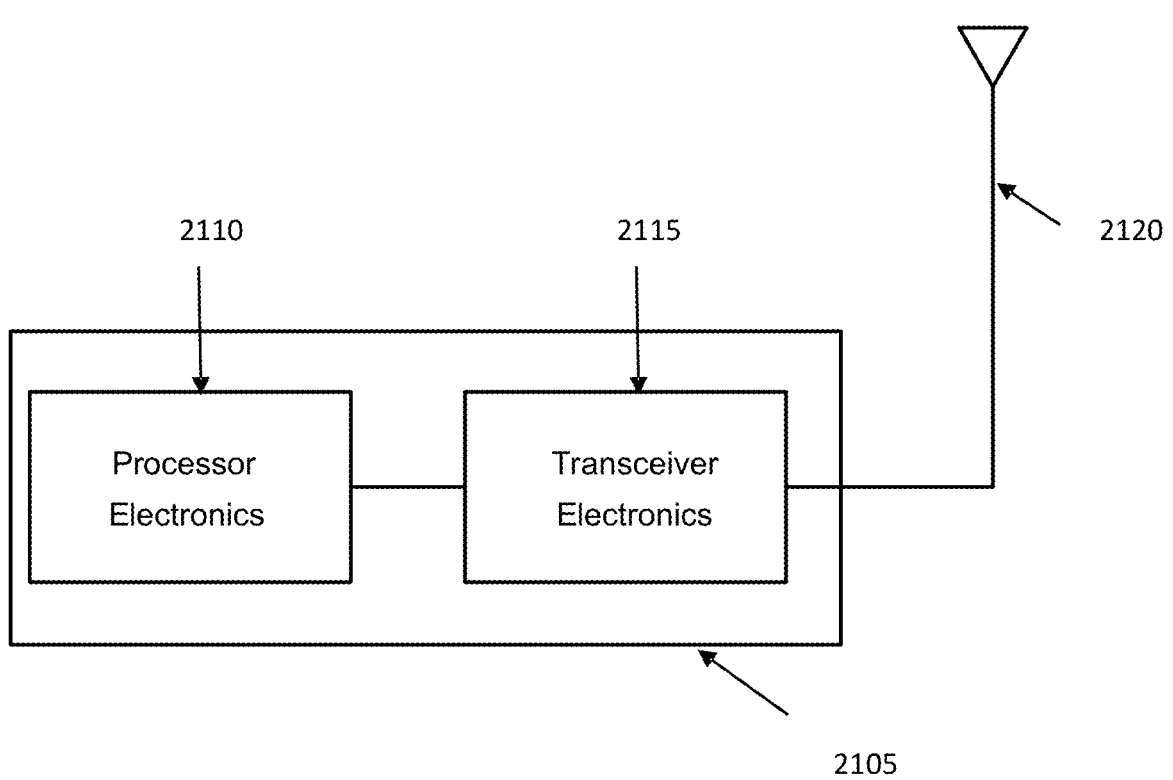
FIG. 21 is a block diagram representation of a portion of a radio station based on one or more embodiments of the disclosed technology can be applied.

FIG. 21 is a block diagram representation of a portion of a radio station based on one or more embodiments of the disclosed technology can be applied. A radio station 2105 such as a base station or a wireless device (or UE) can include processor electronics 2110 such as a microprocessor that implements one or more of the wireless techniques presented in this document. The radio station 2105 can include transceiver electronics 2115 to send and/or receive wireless signals over one or more communication interfaces such as antenna 2120. The radio station 2105 can include other communication interfaces for transmitting and receiving data. Radio station 2105 can include one or more memories (not explicitly shown) configured to store information such as data and/or instructions. In some implementations, the processor electronics 2110 can include at least a portion of the transceiver electronics 2115. In some embodiments, at least some of the disclosed techniques, modules or functions are implemented using the radio station 2105.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A wireless communication method, comprising: determining, by a wireless device, a plurality of physical cell identifiers of a serving cell.

Clause 2. The method of clause 1, further comprising: determining, by the wireless device, a first physical cell identifier corresponding to a target element from the plurality of physical cell identifiers; and determining one or more parameters of the target element based on the first physical cell identifier, wherein the target element includes a channel or a signal.

Clause 3. The method of clause 2, wherein the one or more parameters of the target element includes parameters for generating a sequence for the target element.

Clause 4. The method of clause 3, wherein the sequence includes a pseudo-random sequence, and wherein the parameters for generating the sequence for the target element includes initial parameters for generating the pseudo-random sequence.

Clause 5. The method of clause 3, wherein the parameters for generating the sequence for the target element include at least one of: a time unit offset between the first physical cell identifier and a reference physical cell identifier; a time unit index; a relative index of the first physical cell identifier among the plurality of physical cell identifiers; an indication as to whether a sequence generation function for generating the sequence for the target element includes the relative index of the first physical cell identifier; an indication as to selection of the sequence generation function; or an indication as to whether the sequence generation function includes a time unit index of predetermined type.

Clause 6. The method of clause 5, wherein a time unit associated with the time unit offset or the time unit index includes at least one of a slot or a time domain symbol.

Clause 7. The method of clause 5, wherein the time unit offset is determined based on signaling from a base station.

Clause 8. The method of clause 5, wherein the time unit offset is determined based on a reference time unit offset associated with a reference subcarrier spacing and a subcarrier spacing of the target element.

Clause 9. The method of clause 5, wherein the time unit index of the target element is determined based on the reference signals of the first physical cell identifier.

Clause 10. The method of clause 5, wherein the time unit index of the target element is determined based on a timing of the first physical cell identifier.

Clause 11. The method of clause 5, wherein the reference physical cell identifier is obtained based on at least one of following information configured by a base station in communication with the wireless device: physical cell identifier, absolute radio frequency channel number (ARFCN), a mobility object identifier, or serving cell index.

Clause 12. The method of clause 5, wherein the reference physical cell identifier is a physical cell identifier corresponding to one of PCell, PSCell, or a serving cell of the target element.

Clause 13. The method of clause 2, wherein the first physical cell identifier is determined from the plurality of physical cell identifiers based on information associated with the target element, the information including at least one of a control resource set pool, a transmission configuration indicator state pool, a transmission configuration indicator state, or a bandwidth part.

Clause 14. The method of clause 13, wherein the first physical cell identifier is a physical cell identifier associated with a control resource set pool including a physical downlink control channel scheduling the target element.

Clause 15. The method of clause 13, wherein the first physical cell identifier is a physical cell identifier associated with the transmission configuration indicator state pool including the transmission configuration indicator state of the target element.

Clause 16. The method of clause 13, wherein the first physical cell identifier is a physical cell identifier associated with the transmission configuration indicator state of the target element.

Clause 17. The method of clause 13, wherein the first physical cell identifier is a physical cell identifier associated with the bandwidth part that includes the target element.

Clause 18. The method of clause 2, wherein the one or more parameters of the target element includes at least one of a timing of the target element.

Clause 19. The method of clause 18, further comprising using the timing of the target element to determine information of the target element, the information including at least one of a time domain location of the target element or a time unit index for sequence generation.

Clause 20. The method of clause 2, wherein at least two target elements are in the serving cell, and each of the at least two target elements is associated with a first physical cell identifier respectively.

Clause 21. The method of clause 20, wherein parameters of each of the at least two target elements are determined based on the first physical cell identifier associated with each of at least two target elements respectively.

Clause 22. The method of any of clauses 2-20, wherein the target element is in the serving cell.

Clause 23. The method of any of clauses 1-20, further comprising, reporting by the wireless device, to a second wireless device, a maximum number of the physical cell identifiers activated for a serving cell.

Clause 24. The method of clause 1, wherein each of the plurality of physical cell identifiers is associated with a second element respectively, and wherein the second element includes at least one of a control resource set pool, a transmission configuration indicator state pool, or a bandwidth part in the serving cell.

Clause 25. The method of clause 1, wherein different physical cell identifiers are associated with different second elements, respectively, and wherein each second element includes at least one of a control resource set pool, a transmission configuration indicator state pool, or a bandwidth part in a serving cell.

Clause 26. The method of clause 1, wherein a medium access control element (MAC-CE) signaling activates a physical cell identifier for a second element of the serving cell, wherein the second element includes at least one of a control resource set pool, a transmission configuration indicator state pool, or a bandwidth part in the serving cell.

Clause 27. The method of clause 1, further comprising determining whether boundaries of radio frames corresponding to the plurality of physical cell identifiers are aligned.

Clause 28. The method of clause 27, wherein whether the boundaries of radio frames corresponding to the plurality of physical cell identifiers are aligned are determined based on signaling from a base station, and wherein each of the plurality of physical cell identifiers is associated with frequencies of synchronization signals respectively.

Clause 29. The method of clause 27, further comprising, upon determination that the boundaries of radio frames corresponding to the plurality of physical cell identifiers are not aligned, determining one or more parameters of the target element based on the first physical cell identifier of the target element.

Clause 30. The method of clause 1, wherein the plurality of physical cell identifiers includes at least one physical cell identifier associated with a bandwidth part.

Clause 31. The method of clause 30, wherein each of the multiple physical cell identifiers is associated with at least one of a control resource set pool or a transmission configuration indicator state pool of the bandwidth part.

Clause 32. The method of clause 1, further comprising, upon determination that boundaries of radio frames corresponding to the plurality of physical cell identifiers are not aligned, using different time unit indices for each of the physical cell identifiers to perform a wireless communication.

Clause 33. The method of clause 1, further comprising determining a bandwidth part switching delay depending on a relationship between a third physical cell identifier of a newly activated bandwidth part and a second physical cell identifier of an old bandwidth part.

Clause 34. The method of clause 33, wherein the bandwidth part switching delay is a first bandwidth part switching delay when one or more third physical cell identifiers belong to the second physical cell identifier(s) or is a second bandwidth part switching delay when one or more third physical cell identifiers do not belong to one or more second physical cell identifiers, and wherein the first bandwidth part switching delay smaller than the second bandwidth part switching delay.

Clause 35. The method of clause 33, wherein the physical cell identifier of the bandwidth part includes a physical cell identifier configured for the bandwidth part or a physical cell identifier configured for a transmission configuration indicator state for the bandwidth part.

Clause 36. The method of clause 1, further comprising determining a time of applying a new parameter in a signaling according to relationship between a fourth physical cell identifier of the new parameter and a fifth physical cell identifier of an old parameter.

Clause 37. The method of clause 36, wherein the new parameter comprises at least one of a transmission configuration indicator state or a pathloss reference signal.

Clause 38. The method of clause 36, wherein the signaling includes at least one of a medium access control element (MAC-CE) signaling or a downlink control information (DCI) signaling.

Clause 39. The method of clause 36, wherein a time gap between a time when the new parameter is applied and a predefined time is a first time delay when the fourth physical cell identifier belongs to the fifth physical cell identifier or is a second time delay when the fourth physical cell identifier does not belong to the fifth physical cell identifier, wherein the first time delay is smaller than the second time delay.

Clause 40. The method of clause 39, wherein the predefined time is one of a time when an acknowledgement signal of a physical downlink shared channel (PDSCH) including the signaling is transmitted by the wireless device if the signaling is a medium access control element (MAC-CE) signaling or an end of the signaling if the signaling is a downlink control information (DCI) signaling.

Clause 41. The method of clause 1, further comprising: determining a sixth physical cell identifier from the plurality of physical cell identifiers of the serving cell; and determining a mobility measurement result of the serving cell based on mobility measurement reference signals of the sixth physical cell identifier.

Clause 42. The method of clause 41, wherein the sixth physical cell identifier is activated for the serving cell and includes one or more physical cell identifiers.

Clause 43. The method of clause 42, wherein the sixth physical cell identifier is selected from the plurality of physical cell identifiers activated for the serving cell based on at least one of a relationship between the plurality of physical cell identifiers, a physical cell identifier used for determining a monitoring occasion for a first search space, a physical cell identifier associated with a quasi-co-location assumption for the first search space, or a physical cell identifier selected by a physical random access channel (PRACH).

Clause 44. The method of clause 1, further comprising: determining a seventh physical cell identifier from the plurality of physical cell identifiers of the serving cell; and using the seventh physical cell identifier to obtain first common information.

Clause 45. The method of clause 1, further comprising determining previous first common information to be invalid when the physical cell identifier of the serving cell is updated.

Clause 46. The method of clause 1, further comprising reacquiring, by the wireless device, first common information when the physical cell identifier of the serving cell is updated.

Clause 47. The method of any of clauses 44-46, wherein the first common information includes as least one of a physical broadcast channel (PBCH), a control resource set with a first index, a monitoring occasion of a search space with the first index, a quasi-co-location reference signal for the search space with the first index, a monitoring occasion of a common search space, time domain resources of the common search space, system messages, or random access resource parameters.

Clause 48. The method of clause 44, wherein, upon determination that there are multiple activated physical cell identifiers of the serving cell, the first common information corresponding to the respective physical cell identifiers is acquired by the wireless device based on each activated physical cell identifier.

Clause 49. The method of clause 44, wherein, upon determination that there is only one activated physical cell identifier in the serving cell at a given time, the first common information is obtained based on the activated physical cell identifier.

Clause 50. The method of clause 44, wherein determining a seventh physical cell identifier from multiple physical cell identifiers of the serving cell according to at least one of following information: signaling information or a predetermined rule, physical cell identifier selected during random access, or the relationship of the multiple physical cell identifier.

Clause 51. The method of clause 1, further comprising: determining a mobility reference signal as a quasi-co-location reference signal of a target reference signal in the serving cell, wherein the mobility reference signal is associated with one of the plurality of physical cell identifiers of the serving cell.

Clause 52. The method of clause 51, wherein the mobility reference signal is associated with the one of the plurality of physical cell identifiers and one of an absolute radio frequency channel number (ARFCN), a reference signal resource index, and a mobility object index.

Clause 53. The method of clause 51, wherein the mobility reference signal is a quasi-co-location reference signal of the target reference signal in the serving cell when the target reference signal is a channel state information reference signal (CSI-RS) for tracking.

Clause 54. The method of any of clauses 1-53, wherein the signaling received by the wireless device includes a time unit offset between a physical cell identifier from the plurality of physical cell identifier and a reference physical cell identifier.

Clause 55. The method of any of clauses 1-53, wherein each of the plurality of physical cell identifiers is associated with a third parameter, respectively, wherein the third parameter includes at least one of an absolute radio frequency channel number (ARFCN), or a mobility object identifier.

Clause 56. The method of clause 55, wherein the third parameter associated with a physical cell identifier is determined by a signaling received by the wireless device.

Clause 57. The method of clause 1, further comprising determining a mapping relationship between the plurality of physical cell identifiers and M fourth parameters, wherein M is positive integer, and wherein the fourth parameters include at least one of: C-RNTI; the association between RACH resources and one or more SSBs; the association between RACH resources and one or more UE-specific CSI-RS configurations; common RACH resources; or system information.

Clause 58. The method of any of clauses 44, wherein the multiple physical cell identifiers of the serving cell is activated at different time, there is only one activated physical cell identifier of the serving cell at a given time.

Clause 59. A wireless communication method, comprising determining a mobility measurement reference signal as a quasi-co-location reference signal of a target reference signal in a serving cell.

Clause 60. The method of clause 59, wherein the mobility measurement reference signal is associated with at least one of a physical cell identifier, an absolute radio frequency channel number, a reference signal resource index, or mobility object index.

Clause 61. The method of clause 59, wherein the mobility measurement reference signal includes at least one of a synchronization signal block or a channel state information reference signal (CSI-RS) measurement reference signal configured in a mobility object.

Clause 62. The method of clause 59, wherein the mobility reference signal is determined as the quasi-co-location reference signal of the target reference signal in the serving cell when the target reference signal is a channel state information reference signal (CSI-RS) for tracking.

Clause 63. The method of clause 59, wherein the mobility measurement reference signal is associated with at least one of a physical cell indicator, an absolute radio frequency channel number, a mobility object, a channel state information reference signal resource index for mobility configured in a transmission configuration indicator state of a channel state information reference signal (CSI-RS) for tracking a reference signal.

Clause 64. A wireless communication method, comprising: determining, by a wireless device, a number of physical cell identifiers of a serving cell; and determining, by the wireless device, a parameter of the serving cell according to the number of physical cell identifiers of the serving cell.

Clause 65. The method of clause 64, wherein the determining of the parameter of the serving cell according to the number of physical cell identifier of the serving cell comprise: determining the parameter by a first method when the number is one; and determining the parameter by a second method when the number is more than one.

Clause 66. The method of clause 65, wherein the parameter includes a sequence of a target element in the serving cell, and wherein the determining of the parameter comprises: determining the initial parameters for generating the sequence by a first function when the number is one; and determining the initial parameters for generating the sequence by a second function when the number is more than one.

Clause 67. The method of clause 65, wherein the parameter includes at least one: a mobility measurement result of the serving cell; common information; system information; bandwidth part switching delay; or a time gap between a time when a new parameter is applied in a signaling and a predefined time.

Clause 68. An apparatus for wireless communication, comprising a memory and a processor, wherein the processor reads code from the memory and implements a method recited in any of clauses 1 to 67.

Clause 69. A computer readable program storage medium having code stored thereon, the code, when executed by a processor, causing the processor to implement a method recited in any of clauses 1 to 67.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
determining, by a wireless device, a plurality of physical cell identifiers of a serving cell;
determining, by the wireless device, a first physical cell identifier corresponding to a target element from the plurality of physical cell identifiers;
determining one or more parameters of the target element based on the first physical cell identifier,
wherein the target element includes a channel or a signal,
wherein the plurality of physical cell identifiers of the serving cell correspond to a plurality of second elements in the serving cell, wherein each of the plurality of second elements includes control resource set pool that includes one or more control resource sets, and one bandwidth part in the serving cell includes a plurality of control resource set pools; and
determining, by the wireless device, that different control resource set pools of the plurality of control resource set pools are associated with different physical cell identifiers from the plurality of physical cell identifiers of the serving cell.

2. The method of claim 1, wherein the one or more parameters of the target element includes parameters for generating a sequence for the target element, wherein the parameters for generating the sequence for the target element include at least one of: a time unit offset between the first physical cell identifier and a reference physical cell identifier; a time unit index; a relative index of the first physical cell identifier among the plurality of physical cell identifiers; an indication as to whether a sequence generation function for generating the sequence for the target element includes the relative index of the first physical cell identifier; an indication as to selection of the sequence generation function; or an indication as to whether the sequence generation function includes a time unit index of predetermined type.

3. The method of claim 1, further comprising reporting, by the wireless device, to a second wireless device, a maximum number of the physical cell identifiers activated for the serving cell.

4. The method of claim 1, wherein the second element further includes a transmission configuration indicator state pool.

5. The method of claim 1, wherein a medium access control element (MAC-CE) signaling activates a physical cell identifier for a second element of the serving cell.

6. The method of claim 1, further comprising determining whether boundaries of radio frames corresponding to the plurality of physical cell identifiers are aligned.

7. The method of claim 1, further comprising determining a bandwidth part switching delay depending on a relationship between a third physical cell identifier of a newly activated bandwidth part and a second physical cell identifier of an old bandwidth part.

8. The method of claim 1, further comprising determining a time of applying a new parameter in a signaling according to relationship between a fourth physical cell identifier of the new parameter and a fifth physical cell identifier of an old parameter.

9. The method of claim 1, further comprising:
determining a sixth physical cell identifier from the plurality of physical cell identifiers of the serving cell; and
determining a mobility measurement result of the serving cell based on mobility measurement reference signals of the sixth physical cell identifier.

10. The method of claim 1, further comprising:
determining, by the wireless device, one physical cell identifier from the plurality of physical cell identifiers of the serving cell; and
using the one physical cell identifier to obtain first common information, wherein the first common information includes at least one of a physical broadcast channel (PBCH), information of a control resource set with index 0 (CORESET0), a monitoring occasion of search space 0, a quasi co-location reference signal of search space 0, a monitoring occasion of common search space, a time resource of common search space, system information, or random access resource parameters.

11. The method of claim 1, further comprising,
when the physical cell identifier of the serving cell is updated, determining previous first common information to be invalid or reacquiring, by the wireless device, first common information.

12. The method of claim 1, further comprising:
determining a mobility reference signal as a quasi-co-location reference signal of a target reference signal in the serving cell,
wherein the mobility reference signal is associated with one of the plurality of physical cell identifiers of the serving cell.

13. An apparatus for wireless communication, comprising a memory and processor electronics, wherein the processor electronics is configured to read instructions from the memory and cause the apparatus to implement the method recited in claim 1.

14. A wireless communication method, comprising:

determining, by a wireless device, a mobility measurement reference signal as a quasi-co-location reference signal of a target reference signal in a serving cell, wherein the mobility measurement reference signal is associated with a reference signal resource index and at least one of a physical cell identifier, an absolute radio frequency channel number, wherein the serving cell includes multiple second elements and is configured with a plurality of physical cell identifiers, wherein each of the plurality of the second elements includes a control resource set pool that includes one or more control resource sets, and one bandwidth part in the serving cell includes a plurality of control resource set pools; and determining, by the wireless device, that different control resource set pools of the plurality of control resource set pools are associated with different physical cell identifiers from the plurality of physical cell identifiers of the serving cell.

15. The method of claim 14, wherein the mobility measurement reference signal includes at least one of a synchronization signal block or a channel state information reference signal (CSI-RS) measurement reference signal configured in a mobility object.

16. The method of claim 14, wherein the mobility reference signal is determined as the quasi-co-location reference signal of the target reference signal in the serving cell when the target reference signal is a channel state information reference signal (CSI-RS) for tracking.

17. The method of claim 14, wherein the mobility measurement reference signal is further associated with a channel state information reference signal resource index for mobility configured in a transmission configuration indicator state of a channel state information reference signal (CSI-RS) for tracking a reference signal.

18. A wireless communication method, comprising:

determining, by a wireless device, a number of physical cell identifiers of a serving cell;

determining, by the wireless device, a parameter of the serving cell according to the number of physical cell identifiers of the serving cell wherein the determining of the parameter of the serving cell according to the number of physical cell identifier of the serving cell includes: determining the parameter by a first method when the number is one; and determining the parameter by a second method when the number is more than one, wherein the physical cell identifiers of the serving cell correspond to a plurality of second elements, wherein each of the plurality of the second elements includes a control resource set pool that includes one or more control resource sets, and one bandwidth part in the serving cell includes a plurality of control resource set pools; and determining, by the wireless device, that different control resource set pools of the plurality of control resource set pools are associated with different physical cell identifiers from the plurality of physical cell identifiers of the serving cell.

19. The method of claim 18, wherein the parameter includes a sequence of a target element in the serving cell, and wherein the determining of the parameter comprises:

determining initial parameters for generating the sequence by a first function when the number is one; and determining the initial parameters for generating the sequence by a second function when the number is more than one.

20. The method of claim 18, wherein the parameter includes at least one of: a mobility measurement result of the serving cell; common information; system information; bandwidth part switching delay; or a time gap between a time when a new parameter is applied in a signaling and a predefined time.

* * * * *